(No Model.)
A. C. McCLELLAND.
GRAIN DRILL.
No. 386,484. Patented July 24, 1888.
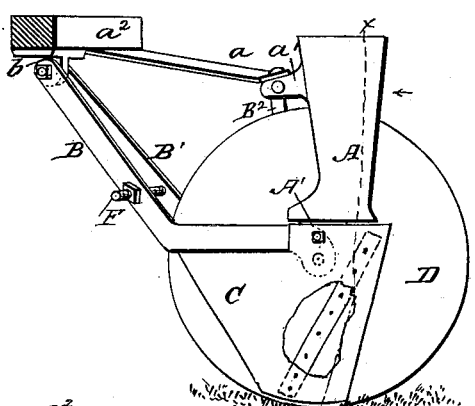
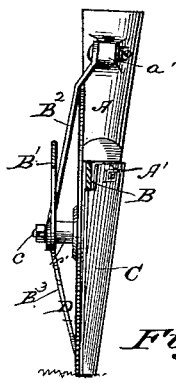
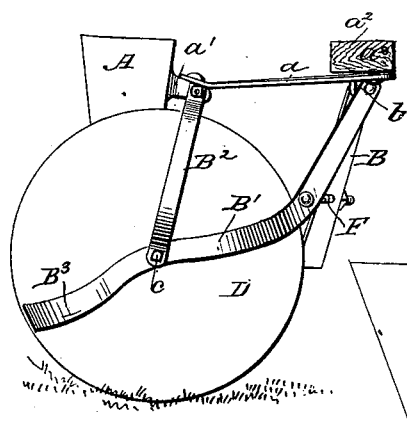
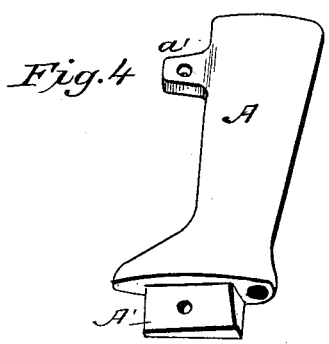
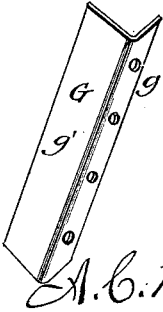
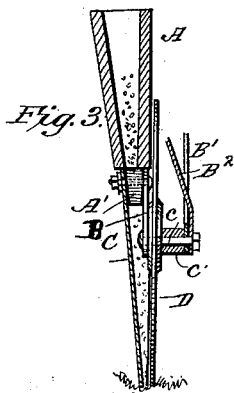
WITNESSES:
Fred G. Dieterich
John A. Kennon
INVENTOR:
A. C. McClelland
BY Munn & Co.
ATTORNEYS.

UNITED STATES PATENT OFFICE.

ALEXANDER C. McCLELLAND, OF ISLAND CITY, OREGON.

GRAIN-DRILL.

SPECIFICATION forming part of Letters Patent No. 386,484, dated July 24, 1888.

Application filed July 22, 1887. Serial No. 245,036. (No model.)

*To all whom it may concern:*

Be it known that I, ALEXANDER C. MCCLELLAND, a citizen of the United States, residing at Island City, in the county of Union and State of Oregon, have invented a new and Improved Grain-Drill, of which the following is a full, clear, and exact description.

Seed-drills have been provided with revolving concave disks or plate-wheels for opening a furrow, and a seed-tube or "boot" has been arranged on one side of such disks for the purpose of delivering grain into the furrow formed by it.

My invention is an improvement in this class of seed-drills, and in place of making the furrow-opening disk concave, (which is objectionable for several reasons,) I employ a flat-sided disk, and combine with it a plate which is in contact with it at the forward edge, but separated at the rear side, so that they co-operate to form the furrow. For convenience of description, and as indicative of the main function of said plate, I shall hereinafter term it the "furrow-opener."

The several features of invention will be hereinafter described and claimed.

In the accompanying drawings, Figures 1 and 2 are opposite side elevations of a portion of a grain drill, one of said views showing the furrow-opener broken away, disclosing the forwardly-inclined grain-conducting plate applied to said furrow-opener. Fig. 1ª is a front view of the furrow-opener and disk, the draft-bars being in section. Fig. 3 is a vertical section on line $x\ x$, Fig. 1. Figs. 4 and 5 are detail views of the boot or seed-tube and the grain-conducting plate. Fig. 6 is a side view of the furrow-opening plate detached.

In the organization of my invention I employ a boot or tube, A, which takes the grain from the seed or grain box, (not here shown,) and which is suitably connected, it may be, as shown, by a bar, $a$, and a bracket, $a'$, to the front cross-bar, $a^2$, of the machine. The lower end of the boot or tube A is provided upon its under side with a reduced wedge-shaped pendant or projection, A', with its apex or tapering edge next to the forward end of the machine.

B B' are two plate-like bars having their forward ends connected, it may be, by a common bolt to a bracket or lug, $b$, pendent from the cross bar $a^2$. One of these bars, B, which, in common with the other bar, B', has its forward portion inclined downwardly and rearwardly, is extended horizontally from its inclined portion, and is bolted at the extreme rear end of said horizontal portion to one side of said wedge shaped projection or pendant A'. The bar B' will be further referred to hereinafter.

C is the furrow-opener, which is connected to the opposite side of said wedge-shaped projection or pendant A', the same bolt securing the bar B also connecting the opener to said projection or pendant. The lower or bottom edge of the furrow-opener C is rounded or convexed, to have substantially a coincident curvature with the periphery of the disk or wheel, presently described, whereby jointly they form the furrow for the reception of the grain passing from the boot or tube down between said wheel or disk and opener.

D is the wheel or disk, which is borne by an axle, $c$, formed with and projecting from one side of the furrow-opener C, and toward which wheel, near its forward and bottom edge, by reason of the inclination of the wedge shaped projection or pendant, the latter is caused to approach or converge, thus enabling the wheel and furrow-opener to have a plow-like action upon the soil, to form, as above recited, the furrow. To the outer or one end of the axle $c$, which projects considerably beyond the disk or wheel D, and which is provided with a sleeve or thimble, $c'$, is connected the bar B', as is also a second plate-like bar, B². The bar B² is connected at its upper end to the bracket $a'$, the lower end of said bar resting against the outer end of the sleeve or thimble $c'$, thus serving, with the bar B', to properly support that end of the axle in position. The bar B' is extended inwardly, rearwardly, and downwardly from the axle $c$ into a scraper, B³, the extreme lower end thereof terminating at a point contiguously to the rear lower edge of the periphery of the wheel or disk D, in order to remove or detach adhering dirt from the latter.

F is an adjusting-screw applied to the bar B' and bearing at its inner end in the bar B. By operating or turning said screw so as to draw the bar B' inward, which in turn draws upon the axle $c$, carrying the wheel or disk D toward the furrow-opener C, the wheel or disk D is adjusted with relation to and caused to bear with greater or less pressure against the furrow-opener.

G is an angular plate, with its wing $g$ bolted to the inner side of the furrow-opener C, so as to dispose the same in a forwardly-inclined position, the main portion, $g'$, thus forming a conductor for the grain falling from the boot or tube A to the furrow.

This invention serves to form the furrow, while it conducts the grain to its destination and avoids side draft.

Having thus fully described my invention, what I claim, and desire to secure by Letters Patent, is—

1. In a grain-drill, the combination, with the wheel or disk and the furrow-opener, of the plate-like bars and the adjusting-screw adapted to bring the wheel or disk toward or against the opener, substantially as set forth.

2. In a grain-drill, the combination, with the boot or tube having at its lower end a wedge-shaped projection depending from its under side, of the furrow-opener secured to one side of said projection and the wheel or disk, substantially as set forth.

3. In a grain-drill, the combination, with the boot having at its lower end a wedge-shaped projection depending from its under side, of the furrow-opener secured to one side of said projection, the plate-like bars, one being secured to the opposite side of said projection and the other bar receiving an adjusting-screw bearing in the aforesaid bar, and the disk or wheel borne by an axle projecting from said furrow-opener, and which axle is connected to one of said bars, substantially as set forth.

ALEXANDER C. McCLELLAND.

Witnesses:
M. W. LASLEY,
C. W. PRESTON.